(12) United States Patent
Anantharaju (10) Patent No.: US 9,832,256 B1
(45) Date of Patent: Nov. 28, 2017

(54) ASSIGNING CLIENT VIRTUAL MACHINES BASED ON LOCATION

(71) Applicant: CA, Inc., Islandia, NY (US)

(72) Inventor: Girish Anantharaju, San Jose, CA (US)

(73) Assignee: CA, Inc., Islandia, NY (US)

( * ) Notice: Subject to any disclaimer, the term of this patent is extended or adjusted under 35 U.S.C. 154(b) by 808 days.

(21) Appl. No.: 14/032,226

(22) Filed: Sep. 20, 2013

(51) Int. Cl.
*H04L 12/803* (2013.01)
*G06F 9/50* (2006.01)
*H04L 29/08* (2006.01)
*H04L 29/06* (2006.01)

(52) U.S. Cl.
CPC .......... *H04L 67/1021* (2013.01); *G06F 9/505* (2013.01); *H04L 67/42* (2013.01)

(58) Field of Classification Search
None
See application file for complete search history.

(56) References Cited

U.S. PATENT DOCUMENTS

| 8,775,625 | B2* | 7/2014 | Narayanaswamy .. G06F 9/4856 709/226 |
| 9,148,428 | B1* | 9/2015 | Banga .................... G06F 9/5027 |
| 9,292,328 | B2* | 3/2016 | Pratt .................... G06F 9/45545 |
| 2008/0201711 | A1* | 8/2008 | Amir Husain .......... G06F 9/445 718/1 |
| 2008/0271015 | A1* | 10/2008 | Ibrahim .............. G06F 9/45537 718/1 |
| 2012/0054367 | A1* | 3/2012 | Ramakrishnan ...... G06F 9/4856 709/242 |
| 2012/0147894 | A1* | 6/2012 | Mulligan ............ G06F 9/45533 370/395.53 |
| 2012/0290643 | A1* | 11/2012 | Fok Ah Chuen ....... H04W 4/02 709/203 |
| 2013/0055256 | A1* | 2/2013 | Banga ..................... G06F 21/53 718/1 |
| 2014/0019970 | A1* | 1/2014 | Okamoto .............. G06F 9/4856 718/1 |
| 2014/0075433 | A1* | 3/2014 | Kotton ................ G06F 9/45558 718/1 |
| 2014/0258533 | A1* | 9/2014 | Antony ............. H04L 29/08144 709/226 |

* cited by examiner

*Primary Examiner* — Aaron Strange
(74) *Attorney, Agent, or Firm* — Stevens & Showalter, LLP (57) ABSTRACT

Providing a virtual machine includes receiving a first request from a first client device, the request comprising information related to accessing one of a plurality of virtual machines, wherein the first client device is associated with a user; and also receiving a first location of the first client device. The method also includes stopping an existing virtual machine, from among the plurality of virtual machines, that is currently executing that is associated with the user; and based on the first location of the first client device, providing a first virtual machine, from among the plurality of virtual machines, to the first client device. At any given time instant there will be only one virtual machine running for a user in hypervisor memory and that one virtual machine is based on a current location of that user.

32 Claims, 5 Drawing Sheets

FIG. 1

| | LOCATION | INTERNAL HOSTNAME | VM-TYPE | MAPPED HOSTNAME |
|---|---|---|---|---|
| 212 | 1 | A | WINDOWS 2008 | Z |
| 214 | 2 | B | RHEL | Z |
| 216 | 3 | C | UBUNTU | Z |

ASSIGNING CLIENT VIRTUAL MACHINES BASED ON LOCATION

BACKGROUND

The present disclosure relates to virtual machines, and more specifically, to selectively provisioning of virtual machines.

Cloud computing is a method of delivering computing resources as a service rather than a product. Hardware resources, software and information are provided to client computers as a service over a network. In this effort, a cloud vendor provides and maintains a hardware and software infrastructure on which an enterprise can deploy virtual machines. The cloud vendor may charge for the services provided to the enterprise based on an amount of resources (e.g., disk space, network bandwidth, processor utilization, etc.) that the virtual machines of an enterprise consume.

A virtual machine is a software implementation of a machine that executes programs and applications just like a physical machine. Sometimes referred to as a "system virtual machine", the virtual machine provides a complete system platform that supports execution of an operating system and any installed application software. Typically, an enterprise constructs a virtual machine by combining an operating system, application software, and the underlying data into a software package that can be executed within an application environment controlled by a hypervisor.

In practice, the cloud vendor provides a server, or other similar computer platform, as a host machine on which a hypervisor is executing. The hypervisor can be thought of as the communications pathway between the virtual machine and the underlying hardware of the host machine. Within the execution environment of the hypervisor, the virtual machine behaves as if it was a physical machine. The virtual machine can be "powered-on" and then boot up from a virtualized hard drive to load the operating system which can then provide access to application software and any underlying data and files.

A user at the enterprise uses a web browser, or other client interface software, to communicate with the hypervisor on the host machine. From the information provided by the hypervisor to the client interface, the user can see which virtual machines are available and select one for execution. Once a virtual machine begins execution, the web browser (or client) interface for the user mimics a physical monitor screen as if the user was using the actual physical hardware that is virtualized by the virtual machine. Based on a particular device (e.g., cell-phone, laptop computer, etc.) that a user is utilizing to access the virtual machine, the user's experience and capabilities may be limited in some instances. Thus, a user may setup different virtual machine configurations that they can select from depending on what type of device they happen to be using at the time they connect with the virtual machine.

BRIEF SUMMARY

According to one aspect of the present disclosure, a method includes receiving a first request from a first client device, the request comprising information related to accessing one of a plurality of virtual machines, wherein the first client device is associated with a user; and also receiving a first location of the first client device. The method also includes stopping an existing virtual machine, from among the plurality of virtual machines, that is currently executing that is associated with the user; and based on the first location of the first client device, providing a first virtual machine, from among the plurality of virtual machines, to the first client device.

According to another aspect of the disclosure, a computer program product includes a computer readable storage medium having computer readable program code embodied therewith. In particular, the computer readable program code includes computer readable program code configured to receive a first request from a first client device, the request comprising information related to accessing one of a plurality of virtual machines, wherein the first client device is associated with a user. The computer readable program code is also configured to receive a first location of the first client device; to stop an existing virtual machine, from among the plurality of virtual machines, that is currently executing that is associated with the user; and based on the first location of the first client device, to provide a first virtual machine, from among the plurality of virtual machines, to the first client device.

According to yet another aspect of the disclosure, a system includes a processor and a memory coupled to the processor, the memory configured to store program code executable by the processor. The system also includes a receiver configured to receive a first request from a first client device, the request comprising information related to accessing one of a plurality of virtual machines, wherein the first client device is associated with a user. The receiver is also configured to receive a first location of the first client device. The program code, when executed by the processor, is configured to stop an existing virtual machine, from among the plurality of virtual machines, that is currently executing that is associated with the user; and to, based on the first location of the first client device, provide a first virtual machine, from among the plurality of virtual machines, to the first client device.

According to yet another aspect of the disclosure, a method for provisioning virtual machines can include receiving a first request from an administrator or a first client device associated with a user, the request comprising information related to provisioning one of a plurality of virtual machines, and wherein the first request comprises a first location of the first client device. In response a first association is created between a first virtual machine, from among the plurality of virtual machines, and the first location and the user; and a second association is created between a hostname and the first virtual machine. The first and second associations can then be stored.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The description that follows includes a number of references to "obtaining a user's location". One of ordinary skill will recognize that there are a variety of different ways to determine geo-physically or geographically where a user (or the user's device) is located. Examples include Global Positioning System (GPS) receivers for establishing (GPS) coordinates; triangulation from cell phone towers, an IP address, an ISP name, or Wi-Fi access point information. These example techniques as well as other techniques currently known in the art or to-be-developed are considered within the scope of the present disclosure. Accordingly, the "user's location" can include a value but can also include metadata that identifies the type of data the location value is. In this way, GPS coordinates would not be compared to an IP address when comparing different location values.

For purposes of this disclosure "a user's location", a "user device's location", and "a client location" are all intended to refer to the same concept of where a user that is using a device running client software is located when accessing or provisioning a virtual machine. One of ordinary skill will recognize that location information about a client can be queried for by a server to which the client connects or it could be automatically pushed by the client to the server early in the process of establishing a communications session with the server.

Figure 1:
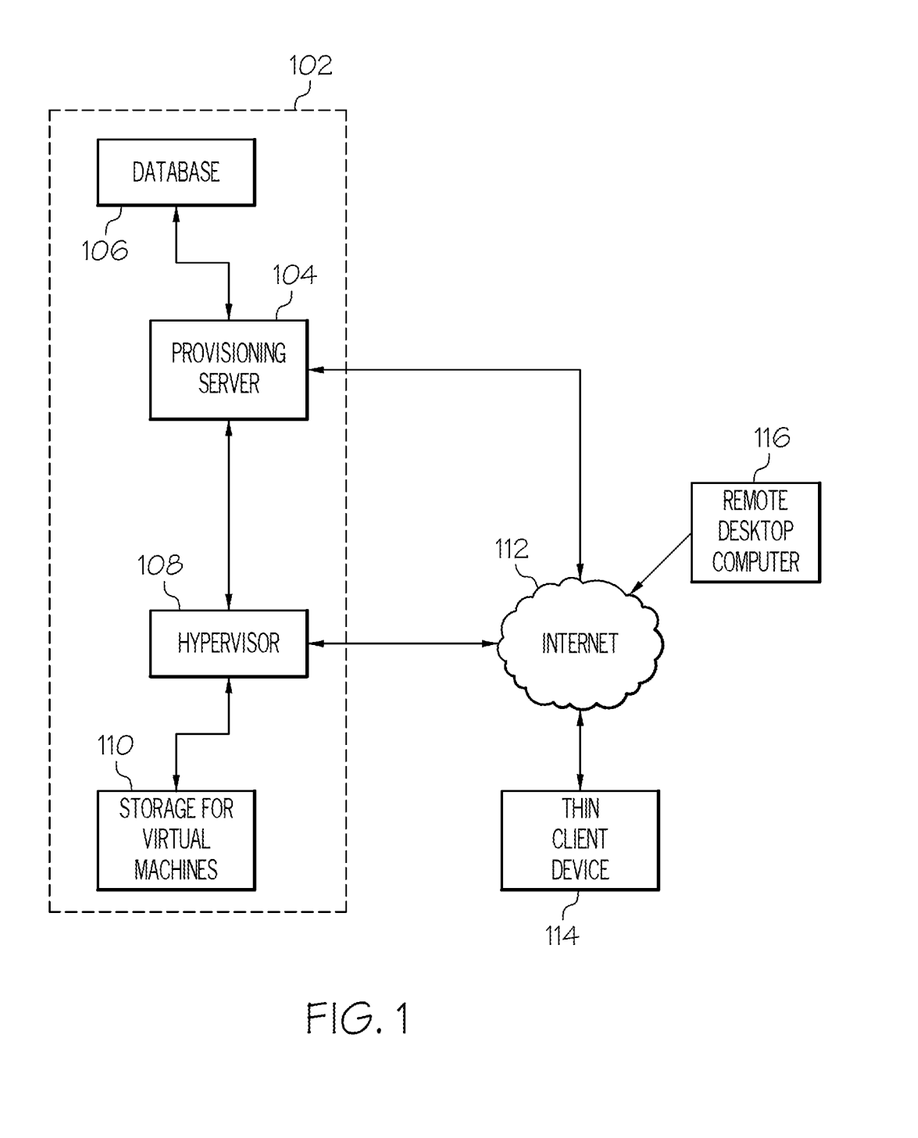
FIG. 1 illustrates an example computing environment in which location-aware virtual machine provisioning and accessing can be deployed in accordance with the principles of the present disclosure.

FIG. 1 illustrates an example computing environment in which location-aware virtual machine provisioning and accessing can be deployed in accordance with the principles of the present disclosure.

In FIG. 1, a cloud computing environment 102 is accessible to client devices 114, 116 through the internet 112. The client devices can include a variety of different devices that can communicate over a network and that provide a respective user interface for a user of that device. Two example classes of client devices are a thin client device 114 with basic functionality to access the hypervisor 108 or the provisioning server 104; and a computer 116 that includes functionality for providing a remote desktop to a user.

Within the cloud computing environment 102 is a provisioning server 104 and a hypervisor 108. In general, the client device 114, 116 communicates with the hypervisor 108 to access a virtual machine. The hypervisor allows the user of the client device 114, 116 to specify a hostname for a virtual machine that they want to access. The hypervisor 108 determines what type of virtual machine has previously been associated with that hostname and provides that virtual machine to the user. Various virtual machines can be stored in a storage device 110 that is accessible by the hypervisor 108.

As explained more fully below, in a process known as "provisioning", the client device 114, 116 can also communicate with a provisioning server 104 to associate a hostname, or hostnames, with a particular virtual machine type. Thus, prior to accessing the hypervisor 108, the user would first interact with the provisioning server 104 to create associations between a hostname and a virtual machine type. A database 106 is maintained by the provisioning server that stores information about the user, the virtual machines provisioned and, as explained below, location information about the user.

In accordance with the principles of the present disclosure, there are two different aspects that can generally be referred to as "provisioning a virtual machine" and "accessing a virtual machine". When provisioning a virtual machine, an end user may visit a provisioning portal embodied as a web-based application such as the provisioning server 104 of FIG. 1. In using the provisioning server 104, a geophysical location of the user is first obtained from the user's device and the user is presented with a number of different types of virtual machine specifications from which they can choose a virtual machine and assign an associated hostname to that virtual machine. The provisioning server 104 is coupled with the database 106 that maintains a database that stores the information about users, locations, virtual machines, and hostnames. The user can repeat this provisioning process at a variety of different physical locations.

In particular, the user may be aware that at one physical location they typically use one type of virtual machine but at a different location they typically use a different virtual machine. This difference may be because of the different roles the user may have at the different locations or may be because of different user devices the user will have at the different locations.

One possible result is that the user will provision a multitude of different virtual machines, each having a corresponding hostname, and will need to remember which hostname to select when at the different locations the user may be at. However, in accordance with the principles of the present disclosure, the provisioning server 104 allows the user to associate different virtual machines with a single hostname. At each different location from which the user provisions a virtual machine, a record is stored in the database 106. In particular, at each different location, the user associates the same hostname with each of the different virtual machines. When the user later accesses a virtual machine based on that hostname, the user's location at that time is used to provide the appropriate one of the different virtual machines previously provisioned.

Figure 2A:
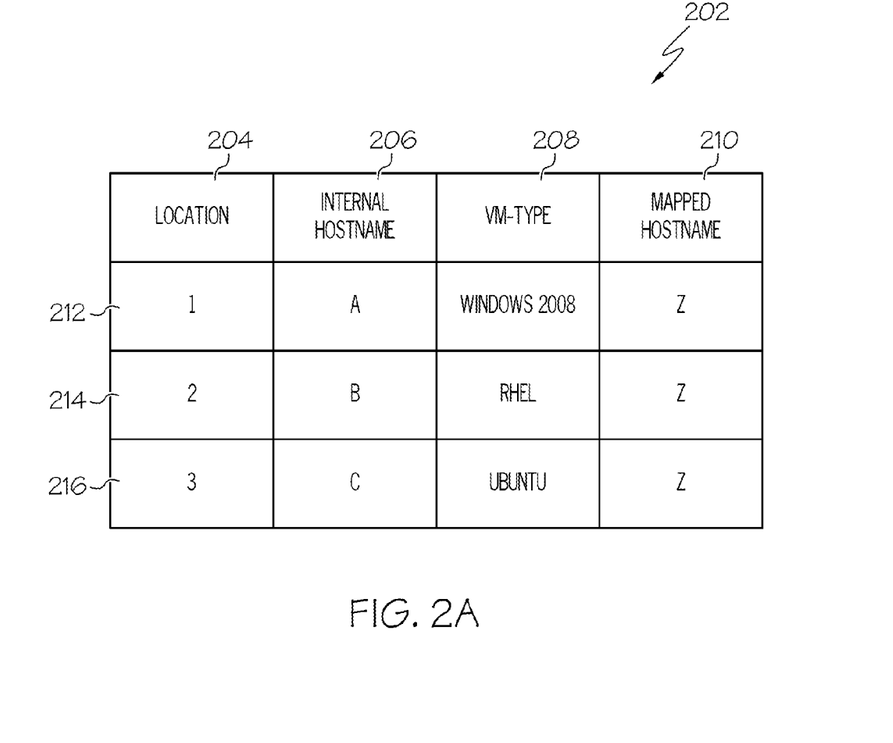
FIG. 2A depicts an example of virtual machine provisioning information in accordance with the principles of the present disclosure.

FIG. 2A depicts an example of virtual machine provisioning information in accordance with the principles of the present disclosure. The table 202 has, for example, four columns LOCATION 204, INTERNAL HOSTNAME 206, VM-TYPE 208, and MAPPED HOSTNAME 210. Each row 212, 214, 216 of the table 202 refers to one particular physical location for that user. The left-most column 204 identifies a physical location that the user associates with a particular virtual machine type. The VM-TYPE is maintained in column 208.

In one example, the table 202 can include an INTERNAL HOSTNAME column 206 that associates an internal hostname with that VM-TYPE shown. During the provisioning process for example, the provisioning server 104 and the hypervisor 108 may communicate with one another to establish that the VM-TYPE shown in column 208 can be associated with an internally generated hostname that the hypervisor 108 and the provisioning server 104 are aware of but not the user. Thus, the information of column 206 may never be revealed to the user. Alternatively, the INTERNAL HOSTNAME column 206 may be omitted. In this instance, the VM-TYPE information of column 208 may be used by the hypervisor 108 when the user actually starts a virtual machine to assign an internal hostname that neither the user nor the provisioning server is aware of. In either case, the hypervisor 108 sends the location information to the provisioning server 104 and receives back some type of identifier that is sufficient for the hypervisor 108 to select an appropriate virtual machine to provide to the user.

The right-most column is the common hostname that the user associated with all the different virtual machines. Thus, when the user first communicates with the hypervisor 108, the user is presented with an interface that allows them to access a virtual machine having a hostname of "Z". This same event will occur when the user initiates communication with the hypervisor 108 from any of the three locations shown in the table 202. However, even though the hostname is "Z" at any of the three locations, the actual virtual machine provided by the hypervisor 108 will be different.

The provisioning information in table 202 of FIG. 2A represents a number of associations that are created between different pieces of information during the provisioning process. A user is associated with a number of different locations and each location is associated with a respective virtual machine. Furthermore, a common hostname is associated with each of the different virtual machines.

Figure 2B:
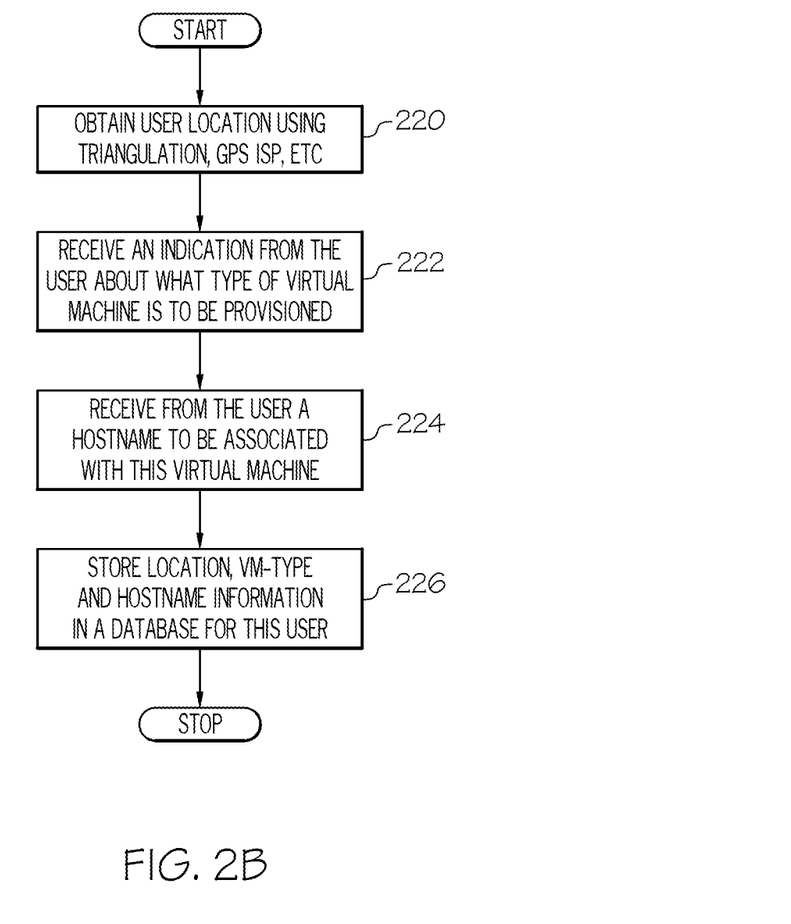
FIG. 2B depicts a flowchart of an example process for provisioning virtual machines in accordance with the principles of this disclosure.

FIG. 2B depicts a flowchart of an example process for provisioning virtual machines in accordance with the principles of this disclosure. When a user, or client, first accesses the provisioning server 104, location information about the user's current location is obtained in step 220. As part of accessing the provisioning server 104, the server obtains the user's credentials and their present location. Thus, the provisioning server 104 can present to a user a list of virtual machine types that is available for the user to provision. The user may, for example be permitted to provision a Red Hat Enterprise Linux (RHEL) virtual machine or a Windows 2008 virtual machine. The different virtual machine types can also specify various hard drive sizes, network interfaces, video displays, and other technical specifications.

Thus, in step 222, the provisioning server 104 receives an indication or a selection of one virtual machine type that is to be provisioned for the user's present location. In step 224, the provisioning server 104 also receives from the user a hostname that is to be associated with the virtual machine type selected earlier. The provisioning server 104 may simply query the user to enter a hostname in a text entry box or present the user with a previously used hostname at a different location so that the user can re-use that hostname at this location.

In step 226, once the hostname and virtual machine type are received from the user, then the provisioning server 104 can store the information for this new location in a database record for this user. Before storing the new information for the user, the provisioning server 104 may, for example, check to determine if a provisioning record already exists for that location and verify that the user wants to over-write the current information. At the end of the process of FIG. 2B, a database table of records similar to that shown in FIG. 2A will be available for a user that maps different virtual machine types to a different geographical locations but the user need only remember one hostname (e.g., "Z") to access an appropriate one of the different types of virtual machines.

It is contemplated within the principles of the present disclosure that the provisioning process just described can also be accomplished by an administrator or similar role. For example a user could provide different locations and different virtual machine types to the administrator who can then construct database records similar to that shown in FIG. 2A.

In general, when accessing a virtual machine, the user communicates with the hypervisor 108 and provides location information and the user's identity. This information is then provided to the provisioning server 104 which, based on this information and the settings of the table 202, provides the hypervisor 108 with information about what type of virtual machine is associated with the current location for this user. The hypervisor 108 can automatically power up the appropriate type of virtual machine for this user (and their location) or the hypervisor could present an interface screen and receive the user's selection of a virtual machine hostname and power up the appropriate type of virtual machine as specified in the table 202.

Figure 3:
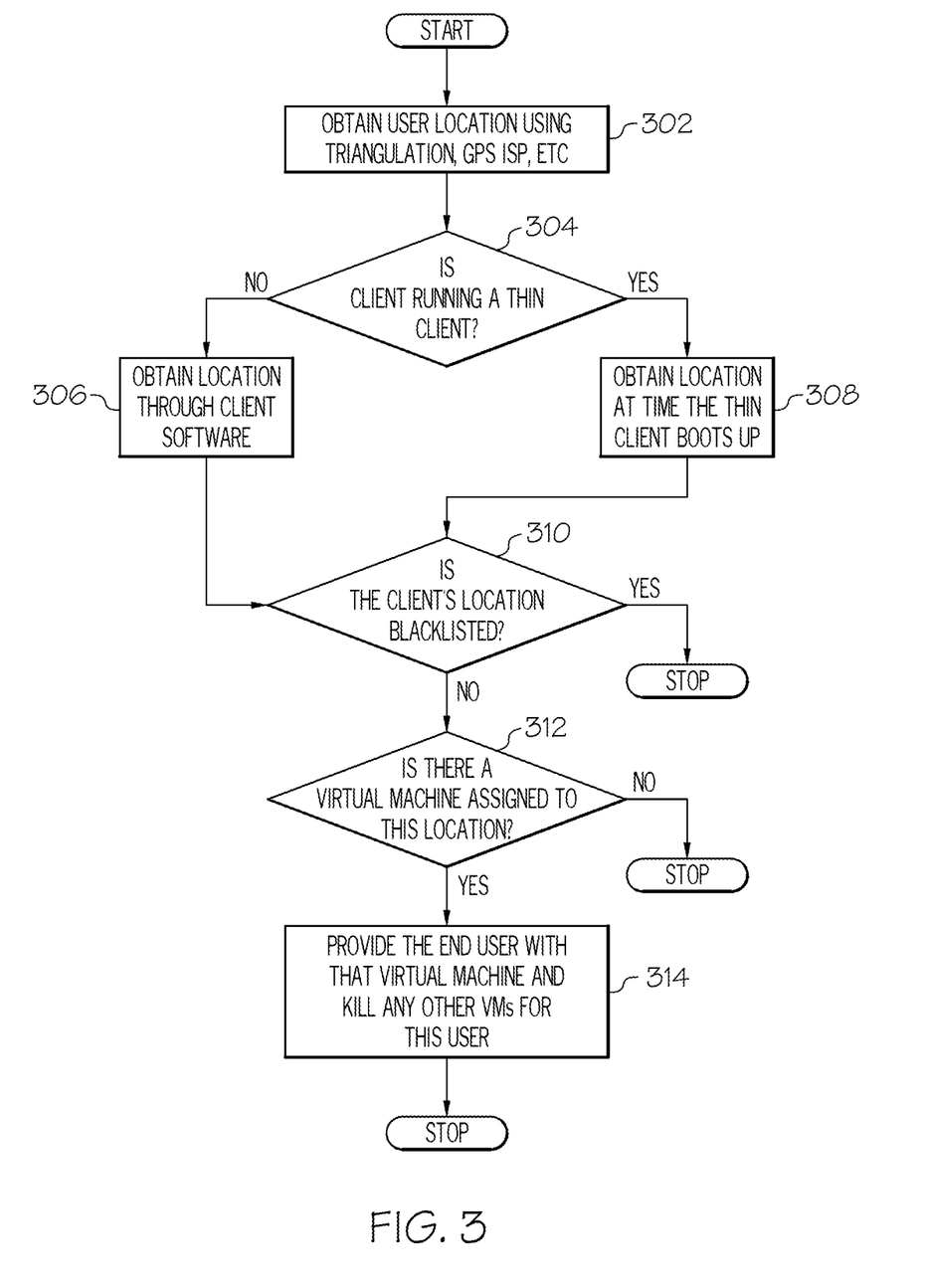
FIG. 3 depicts a flowchart of an example process for accessing a virtual machine in accordance with the principles of the present disclosure.

FIG. 3 depicts a flowchart of an example process for accessing a virtual machine in accordance with the principles of the present disclosure. In FIG. 3, steps 302, 304, 306 and 308 perform generally a single function of obtaining client location information. However, some of the details of this function can be more easily seen by separating the steps as shown in FIG. 3. In particular, a user accesses the hypervisor 108 with a client device and in step 302 the hypervisor 108 obtains the location information from the client. The hypervisor 104 determines, in step 304, whether the client is a thin client. Typically a thin client would be a device that has little capability other than accessing the hypervisor 108 in order to provide an interface to a virtual machine. If the client is a thin client, then the hypervisor 108, in step 308, obtains the location information that was generated during the thin client boot-up.

One alternative is that the client device is a more robust computing platform that runs a variety of software including some type of client software (e.g. remote desktop) for accessing the hypervisor 108. If so, then in step 306 the hypervisor 108 can obtain location information through the client software. Either way, the hypervisor 108 can determine, in step 310, whether the client's current location is forbidden (e.g., blacklisted.) If the client's current location is a forbidden location, then the hypervisor terminates communication with the client device.

If, however, the client location is not forbidden, then the hypervisor 108 checks, in step 312, with the provisioning server 104 to determine if this user has associated a virtual machine type with this current location. If so, then the hypervisor 108 can power up that virtual machine in step 314. As part of powering up the virtual machine the hypervisor 108 may use an internal hostname (e.g., a randomly constructed string) and map that to the hostname (e.g., hostname "Z") the user associated with that virtual machine type during the provisioning process of FIG. 2B. Thus, any reference by the client to hostname "Z" can be resolved to a hostname actually in use by the hypervisor 108.

As a way to ensure that a user can only have one virtual machine running on the hypervisor 108 at any given time, the hypervisor 108 can, in step 314, power down any virtual machines which the user started at some different location. Thus, if the hypervisor 108 determines that this user already has an executing virtual machine, then the hypervisor can power it down before starting a new virtual machine. The hypervisor 108 can also include functionality that determines an amount of time a virtual machine may have been idle and kill virtual machines that have been idle for more than a predetermined period of time. "Idleness" can include lack of user input or other type of user activity.

If the user does not, in step 312, have a virtual machine type assigned to the current location, then the hypervisor 108 can stop communicating with the client. Alternatively, the hypervisor 108 may be designed to provide the user with instructions on accessing the provisioning server 104 in order to add a virtual machine for the current location.

The blacklist of forbidden locations can include multiple levels of details. For example, a physical location identified by a set of GPS coordinates may have two wireless networks in place. One wireless network being a public network and a second network being more secure. The blacklist may, therefore, forbid users at the location on the public network (e.g., determined by IP address) from accessing virtual machines while allowing users at that location on the secure network to access virtual machines.

In step 312 of FIG. 3, a determination is made if there is a virtual machine assigned to the user's current location. This determination includes comparing the current location with the location that was specified during the provisioning process. Whether or not a current location matches the location used during provisioning depends on the type of location information that is being compared. For example, GPS coordinates may have some variance so that two coordinates within 100 feet of one another may be considered to match. However, when comparing IP addresses an exact match of the network number portion may be required to define a match.

As mentioned above, an idle virtual machine may be powered down by the hypervisor and a currently running virtual machine for a user can be powered down when a user attempts to access another virtual machine from a different location. Additionally, the hypervisor can periodically obtain current location information from a user during their session with the virtual machine. Thus, if the user with a mobile device is provided with a virtual machine based on an initial location and that user moves, then the hypervisor can become aware of this movement. If for example, the user moves more than a predetermined distance from the initial location or moves to a blacklisted location, the hypervisor may power down the virtual machine.

Figure 4:
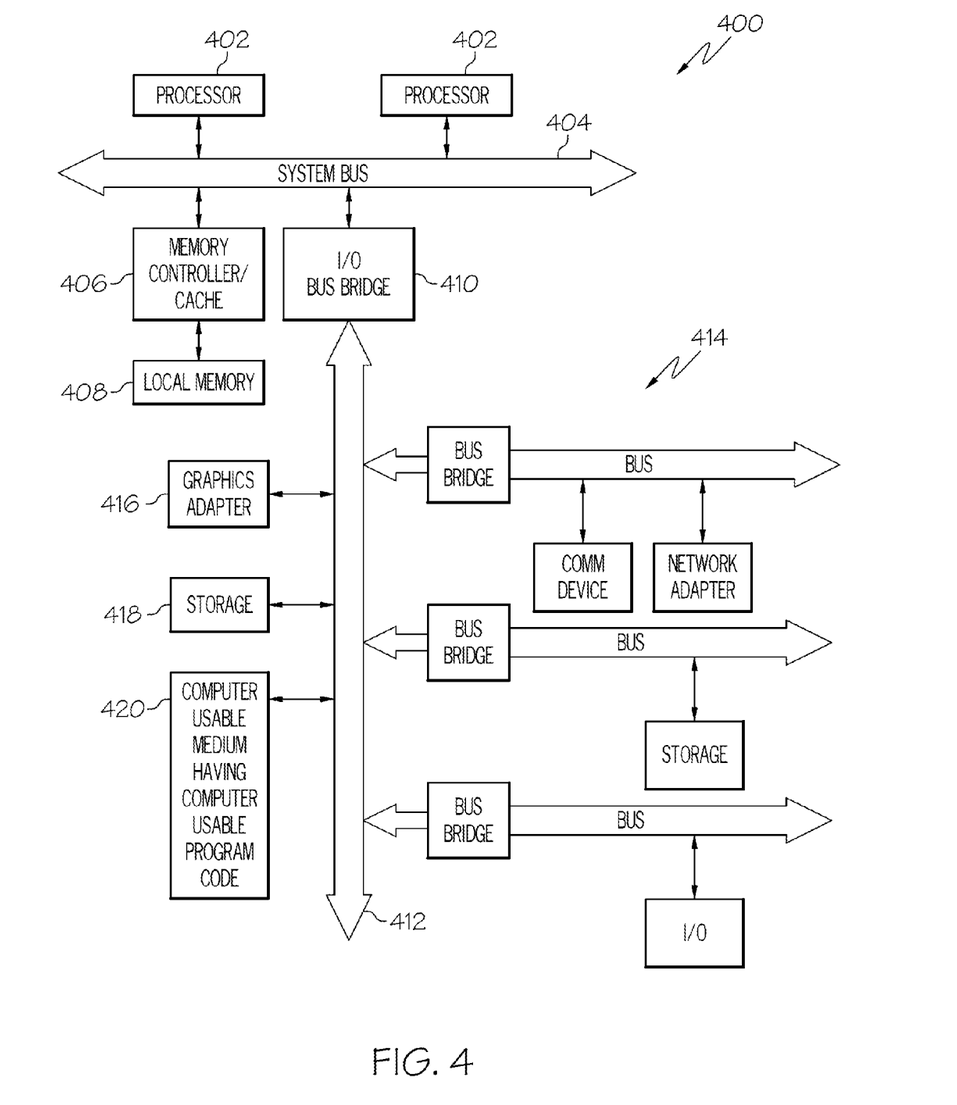
FIG. 4 is a block diagram of a data processing system in accordance with the principles of the present disclosure.

Referring to FIG. 4, a block diagram of a data processing system is depicted in accordance with the present disclosure. A data processing system 400, such as may be utilized to implement the hardware platform (e.g. 104 or 108) or aspects thereof, e.g., as set out in greater detail in FIG. 1-FIG. 3, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more busses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks to transmit and/or receive data in various formats.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 3.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, material s, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
receiving, by a computer, a first request from a first client device, the request comprising information related to accessing one of a plurality of virtual machines, and wherein the first client device is associated with a user;
receiving, by the computer, a first location of the first client device;
in response to the first request, powering down, by the computer, an existing virtual machine, from among the plurality of virtual machines, that is currently executing on the computer, that is associated with the user; and
based on the first location of the first client device, powering up on the computer, a first virtual machine, from among the plurality of virtual machines, for the first client device,
wherein the existing virtual machine is powered down before the first virtual machine is powered up.

2. The method of claim 1, comprising:
determining, by the computer, the first virtual machine, from among the plurality of virtual machines, based on the first location of the first client device.

3. The method of claim 1, wherein the first location relates to at least one of global positioning system coordinates, IP address, triangulation data, or a Wi-Fi access point.

4. The method of claim 1, comprising:
transmitting, by the computer, the first location to a provisioning server; and
in response, receiving from the provisioning server an identifier of the first virtual machine.

5. The method of claim 1, comprising:
determining, by the computer, when the first location of the first client device is a predetermined forbidden location; and
ending, by the computer, communication with the first client device, when the first client device is determined to be in the predetermined forbidden location.

6. The method of claim 1, comprising:
determining, by the computer, when one of a plurality of previously stored location values matches the first location.

7. The method of claim 6, comprising:
ending, by the computer, communication with the first client device when the first location does not match any of the plurality of previously stored location values.

8. The method of claim 1, comprising:
determining, by the computer, when the existing virtual machine associated with the user is currently executing on the computer;
wherein the existing virtual machine was started on the computer in response to a second request from a second client device associated with the user, the second request comprising information related to accessing the existing virtual machine when the second client device was at a second location; and wherein the first virtual machine is a different type of virtual machine than the existing virtual machine.

9. The method of claim 8, wherein:
the first request comprises a hostname, the hostname associated with the first virtual machine; and
the second request comprises the hostname, the hostname associated with the existing virtual machine.

10. The method of claim 1, comprising:
powering down the first virtual machine, by the computer, when the first virtual machine is idle for more than a predetermined time period.

11. The method of claim 1, wherein the first virtual machine and the existing virtual machine execute in a same hypervisor executing on the computer.

12. A system comprising:
a processor;
a non-transitory memory in communication with the processor;
a receiver coupled with the processor and configured to receive a first request from a first client device, the request comprising information related to accessing one of a plurality of virtual machines, and
wherein the first client device is associated with a user;
the receiver further configured to receive a first location of the first client device;
the non-transitory memory storing instructions executable by the processor to:
in response to the first request, power down an existing virtual machine, from among the plurality of virtual machines, that is currently being executed by the processor and that is associated with the user; and
based on the first location of the first client device, power up a first virtual machine, from among the plurality of virtual machines, for the first client device,
wherein the existing virtual machine is powered down before the first virtual machine is powered up.

13. The system of claim 12, wherein the instructions are executable by the processor to:
determine the first virtual machine, from among the plurality of virtual machines, based on the first location of the first client device.

14. The system of claim 12, wherein the first location relates to at least one of global positioning system coordinates, IP address, triangulation data, or a Wi-Fi access point.

15. The system of claim 12, wherein the program code, when executed by the processor, is further configured to:
transmit the first location to a provisioning server; and
receive from the provisioning server an identifier of the first virtual machine.

16. The system of claim 12, wherein the instructions are executable by the processor to:
determine when the first location of the first client device is a predetermined forbidden location; and
end communication with the first client device, when the first client device is determined to be in the predetermined forbidden location.

17. The system of claim 12, wherein the instructions are executable by the processor to:
determine when one of a plurality of previously stored location values matches the first location.

18. The method of claim 17, wherein the instructions are executable by the processor to:
end communication with the first client device when the first location does not match any of the plurality of previously stored location values.

19. The system of claim 12, wherein the instructions are executable by the processor to:
determine when the existing virtual machine associated with the user is currently being executed by the processor;
wherein execution of the existing virtual machine was started in response to a second request from a second client device associated with the user, the second request comprising information related to accessing the existing virtual machine when the second client device was at a second location; and
wherein the first virtual machine is a different type of virtual machine than the existing virtual machine.

20. The system of claim 19, wherein:
the first request comprises a hostname, the hostname associated with the first virtual machine; and
the second request comprises the hostname, the hostname associated with the existing virtual machine.

21. The system of claim 12, wherein the instructions are executable by the processor to:
power down the first virtual machine when the first virtual machine is idle for more than a predetermined time period.

22. The system of claim 12, wherein the first virtual machine and the existing virtual machine execute in a same hypervisor executed by the processor.

23. A non-transitory computer readable storage medium having instructions stored thereon that are executable by a computing device to perform operations comprising:
receiving by the computing device a first request from a first client device, the request comprising information related to accessing one of a plurality of virtual machines, and
wherein the first client device is associated with a user;
receiving a first location of the first client device;
in response to the first request, powering down an existing virtual machine, from among the plurality of virtual machines, that is currently executing on the computing device, that is associated with the user; and
based on the first location of the first client device, power up on the computing device a first virtual machine, from among the plurality of virtual machines, for the first client device,
wherein the existing virtual machine is powered down before the first virtual machine is powered up.

24. The computer program product of claim 23, wherein the instructions are executable by the computing device to perform operations comprising:
determining the first virtual machine, from among the plurality of virtual machines, based on the first location of the first client device.

25. The computer program product of claim 23, wherein the first location relates to at least one of global positioning system coordinates, IP address, triangulation data, or a Wi-Fi access point.

26. The computer program product of claim 23, wherein the instructions are executable by the computing device to perform operations comprising:
transmitting the first location to a provisioning server; and
receiving from the provisioning server an identifier of the first virtual machine.

27. The computer program product of claim 23, wherein the instructions are executable by the computing device to perform operations comprising:
determining when the first location of the first client device is a predetermined forbidden location; and
ending communication with the first client device, when the first client device is determined to be in the predetermined forbidden location.

28. The computer program product of claim 23, wherein the instructions are executable by the computing device to perform operations comprising:
  determining when one of a plurality of previously stored location values matches the first location.

29. The computer program product of claim 28, wherein the instructions are executable by the computing device to perform operations comprising:
  ending communication with the first client device when the first location does not match any of the plurality of previously stored location values.

30. The computer program product of claim 23, wherein the instructions are executable by the computing device to perform operations comprising:
  determining when the existing virtual machine associated with the user is currently executing;
  wherein the existing virtual machine was started on the computing device in response to a second request from a second client device associated with the user, the second request comprising information related to accessing the existing virtual machine when the second client device was at a second location; and
  wherein the first virtual machine is a different type of virtual machine than the existing virtual machine.

31. The computer program product of claim 30, wherein:
  the first request comprises a hostname, the hostname associated with the first virtual machine; and
  the second request comprises the hostname, the hostname associated with the existing virtual machine.

32. The computer program product of claim 23, wherein the instructions are executable by the computing device to perform operations comprising:
  powering down the first virtual machine, by the computer, when the first virtual machine is idle for more than a predetermined time period.

\* \* \* \* \*